(12) United States Patent
Shi et al.

(10) Patent No.: US 8,909,999 B2
(45) Date of Patent: Dec. 9, 2014

(54) DYNAMIC VOLTAGE SCALING SYSTEM BASED ON ON-CHIP MONITORING AND VOLTAGE PREDICTION

(75) Inventors: Longxing Shi, Jiangsu (CN); Weiwei Shan, Jiangsu (CN); Jun Yang, Jiangsu (CN); Haolin Gu, Jiangsu (CN); Xinning Liu, Jiangsu (CN); Yang Zhang, Jiangsu (CN)

(73) Assignee: Southeast University, Jiangsu (CN)

(*) Notice: Subject to any disclaimer, the term of this patent is extended or adjusted under 35 U.S.C. 154(b) by 100 days.

(21) Appl. No.: 13/700,426

(22) PCT Filed: Oct. 17, 2011

(86) PCT No.: PCT/CN2011/080851
§ 371 (c)(1),
(2), (4) Date: Nov. 27, 2012

(87) PCT Pub. No.: WO2013/020323
PCT Pub. Date: Feb. 14, 2013

(65) Prior Publication Data
US 2013/0154583 A1    Jun. 20, 2013

(30) Foreign Application Priority Data
Aug. 8, 2011 (CN) .......................... 2011 1 0225381

(51) Int. Cl.
| | |
|---|---|
| G06F 11/00 | (2006.01) |
| G05F 1/10 | (2006.01) |
| G06F 1/26 | (2006.01) |
| G06F 11/30 | (2006.01) |

(52) U.S. Cl.
CPC .. *G05F 1/10* (2013.01); *G06F 1/26* (2013.01); *G06F 11/008* (2013.01); *G06F 11/3058* (2013.01)
USPC ................................ 714/704; 714/45; 714/54

(58) Field of Classification Search
CPC ..................................... H04L 1/20; H04L 1/24
USPC .............................................. 714/704, 45, 47
See application file for complete search history.

(56) References Cited

U.S. PATENT DOCUMENTS

| | | | |
|---|---|---|---|
| 7,437,580 B2 | 10/2008 | Henderson et al. | |
| 8,368,457 B2* | 2/2013 | Ikenaga | 327/530 |
| 8,639,987 B2* | 1/2014 | Whatmough et al. | 714/47.1 |
| 2004/0236972 A1 | 11/2004 | Brown et al. | |
| 2010/0281309 A1* | 11/2010 | Laurenti et al. | 714/45 |

FOREIGN PATENT DOCUMENTS

| | | |
|---|---|---|
| CN | 101710254 A | 5/2010 |
| CN | 101882103 A | 11/2010 |
| CN | 102063144 A | 5/2011 |
| CN | 201887663 U | 6/2011 |

* cited by examiner

OTHER PUBLICATIONS

International Search Report dated Apr. 26, 2012 from International Patent Application No. PCT/CN2011/080851 filed Oct. 17, 2011 (4 pages).

*Primary Examiner* — Fritz Alphonse
(74) *Attorney, Agent, or Firm* — Sunstone IP

(57) ABSTRACT

A dynamic voltage scaling system based on on-chip monitoring and voltage prediction is disclosed, comprising a main circuit that has integrated on-chip monitoring circuits, a supply voltage scaling module, and voltage converters, wherein, the supply voltage scaling module comprises a sampling and statistics module designed to calculate the error rate of the main circuit in the current time slice, a state recording module designed to record the error rate and the corresponding supply voltage, an error prediction module, and a state transition probability generation module; the error prediction module predicts the error trend of the main circuit in a future time slice according to the state recording module and the state transition probability generation module, and generates regulation signals and sends to the corresponding voltage converters, so as to generate the voltage required for operation of the entire main circuit.

5 Claims, 2 Drawing Sheets

DYNAMIC VOLTAGE SCALING SYSTEM BASED ON ON-CHIP MONITORING AND VOLTAGE PREDICTION

FIELD OF THE INVENTION

The present invention relates to a dynamic voltage scaling system, particularly to a dynamic voltage scaling system based on on-chip monitoring and voltage prediction, which belongs to the field of embedded chip design

BACKGROUND OF THE INVENTION

As integrated circuits are further reduced in process-dimension towards very deep sub-micron (VDSM) level or even nanometer level, the density of power consumption on chip unit area increases exponentially, making power consumption an important issue which is an inevitable consideration in integrated circuit design, besides circuit performance Especially, in recent years, various systems on chip (SoC), such as battery-powered hand-held devices and wireless sensor network node chips, etc., has increasingly high demand for power consumption; therefore, how to minimize the power consumption of chips has become a key in the field of integrated circuit design.

In existing low-power consumption chips, the dynamic power consumption of chip is effectively reduced by the dynamic voltage scaling method according to the performance requirement and power consumption level of SoC; however, the conventional low-power consumption applications oriented dynamic voltage scaling technique employs an open loop system, which determines the value of VDD by looking up in a pre-established relational table of supply voltage VDD vs. operating frequency f of the SoC, and can't make quick and accurate response to the real-time operating condition of the SoC; therefore, the regulation has some drawbacks such as blindness, poor control and low accuracy, etc.

The on-chip monitoring method monitors the working condition of the circuit in real time by inserting on-chip monitoring circuits to the terminals of critical paths in the main circuit of the SoC, and attributes the impacts of process variation, power supply voltage fluctuation, temperature variation, and noise, etc. on the circuit to the variations of time-delay characteristics of the on-chip monitoring circuits in the critical paths. Once timing violation occurs in the circuit, the on-chip monitoring circuit will create a corresponding error signal, which will be used as the scaling basis for a supply voltage scaling module.

The schematic diagram of dynamic voltage scaling based on on-chip monitoring circuits is shown in FIG. 1. This method can monitor the error level of the main circuit in real time during operation, and reflect the actual impact of global and local disturbances on the circuit; by introducing an error detection and correction mechanism, the voltage margin reserved in the main circuit design stage against adverse factors such as process variation, power supply voltage fluctuation, temperature variation, and noise, etc. can be further released, so that the chip will operate at the allowable minimum supply voltage, and therefore the power consumption will be optimized.

In practice, voltage converters (e.g., DC-DC, LDO) are usually required for supply voltage scaling, and these devices take some time in themselves during voltage scaling, which means the voltage scaling has a hysteretic nature. This problem is not taken into account in the conventional voltage scaling method. As a result, when the voltage scaling is completed, the working environment and state of the circuit may have been changed, and at this time the regulated voltage can't meet the operating demand of the circuit currently. Therefore, an appropriate mechanism is required to predict the variation trend of the operating voltage of the circuit, so as to guide the voltage converters for voltage scaling and reserve some time for voltage conversion in the converters, and thereby adapt to the circuit variations in a better way.

The prediction object of the Markov chain is a dynamic system with random variations, and its prediction is to speculate the future developing trend of a system according to the state transition probability between states. The Markov process requires that the states don't have after-effect. The internal working environment of a chip is subject to the impact of temperature, process variation, and noise, etc.; all of these are random variables, and the instruction executed by the circuit at a specific moment has a certain randomness. Therefore, the process that the on-chip monitoring circuit monitors the circuit error probability in a fixed time period is a random process. Since the current state of a circuit is the accumulative of the "past" and the future variation depends on the "current" condition instead of the past condition, therefore the random process meets the characteristics of Markov process.

DISCLOSURE OF THE INVENTION

Technical Problem

In view of the drawbacks in the prior art, an object of the present invention is to provide a dynamic voltage scaling system based on on-chip monitoring and voltage prediction, which can overcome the hysteretic nature of voltage scaling and reserves some time for voltage scaling in the voltage converters, and thereby can adapt to circuit variations in a better way.

Technical Solution

To attain the object described above, the present invention employs the following technical scheme:

The present invention comprises a main circuit that has integrated on-chip monitoring circuits, a supply voltage scaling module, and a voltage converter connected to the output terminal of the supply voltage scaling module, wherein, the input terminal of the main circuit is connected to the output terminal of the voltage converter, the supply voltage scaling module comprises a state transition probability generation module and an error prediction module designed according to the main circuit, and a sampling and statistics module and a state recording module connected in sequence to the output terminals of the on-chip monitoring circuits. The output terminals of the state recording module and state transition probability generation module are connected to the input terminals of the error prediction module. The on-chip monitoring circuit sends the monitored error signals to the sampling and statistics module which calculates the error rate of the main circuit in the current time slice, and outputs to the state recording module, and the state recording module records the error rate and the corresponding supply voltage. The error prediction module utilizes the Markov theory to predict the error rate of the main circuit in the future time slice according to the error rate and corresponding supply voltage recorded by the state recording module and the state transition probability generated by the state transition probability generation module, and generates regulation signals for controlling the output voltages of the voltage converters.

The state transition probability generation module employs a state transition probability look-up table.

The state transition probability look-up table is created as follows:

After the main circuit design is completed, the main circuit is subjected to run a large-size program at different voltages, and perform statistics in a large quantity, to obtain the state transition probability of the main circuit from the current state skip to the next state at different voltages, and store in the form of a look-up table.

The processing procedure of the sampling and statistics module comprises the following steps:

First, divide the operation time of the main circuit into N time slices in equal length;

Next, perform statistics on the total number of error signals $N_{error}$ in the main circuit sent from the on-chip monitoring circuits in the $n-1^{th}$ time slice;

Finally, calculate the error rate $R_{error}$ of the main circuit in the $n-1^{th}$ time slice: $R_{error}=N_{error}/N_{total}$, where, $N_{total}$ is the total number of sampled signals in the main circuit in the $n-1^{th}$ time slice;

Where, $2 \leq n \leq N-1$, $N \geq 3$, and N, n are integral numbers.

To ensure the voltage converter has regulated the voltage of the main circuit in $n^{th}$ time slice to the predicted value for the main circuit in the $n+1^{th}$ time slice, the length of the time slice shall not be shorter than the maximum duration required for performing voltage scaling once by the voltage converter.

Beneficial Effects

The present invention overcomes the drawback of hysteretic nature of the conventional dynamic voltage scaling system based on on-chip monitoring for voltage scaling in occasions where high real-time performance is required, it utilizes the Markov theory to predict the "future" timing violation level of the circuit according to the "past" working condition and "current" working condition of the main circuit, and reserves time for voltage scaling in the voltage converters, so that the dynamic voltage scaling has high directivity and purposiveness, and can adapt to the real-time variations of the operating environment of chip in a better way, as a result, the system performance is greatly improved.

DETAILED DESCRIPTION OF THE EMBODIMENTS

To make the technical means, creative characteristics, attained object and efficacy of the present invention understood more clearly, hereunder the present invention will be detailed along with some embodiments.

Figure 1:
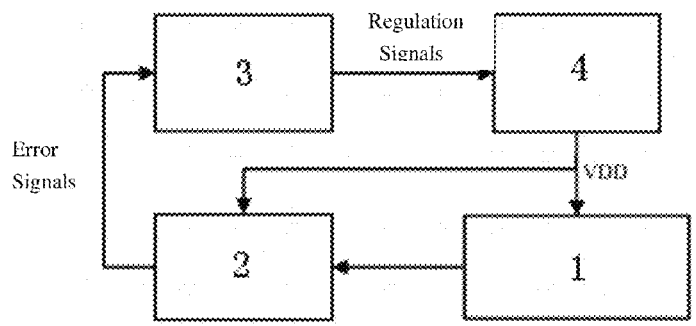
FIG. 1 is a block diagram of the overall structure of the present invention; (in this figure: main circuit—1, on-chip monitoring circuit—2, supply voltage scaling module—3, voltage converter—4).

Referring to FIG. 1, the present invention comprises a main circuit 1 that has integrated on-chip monitoring circuits 2, a supply voltage scaling module 3 connected to the output terminals of the on-chip monitoring circuit 2, and a voltage converter 4 (e.g., DC-DC, LDO, etc.) connected to the output terminal of the supply voltage scaling module 3, wherein, the input terminal of the main circuit 1 is connected to the output terminal of the voltage converter 4, and the voltage converter 4 provide supply voltage to the main circuit 1.

In the main circuits 1, on-chip monitoring circuits 2 are inserted selectively to the terminals of several critical paths to monitor the operating state of the main circuit 1 in real time; once timing violation occurs in the monitored critical path, the on-chip monitoring circuit 2 in the path will generate an error signal. After the error signals of many on-chip monitoring circuits 2 are performed "OR" operation, an overall error signal will be sent to the supply voltage scaling module 3; the supply voltage scaling module 3 will generate a regulating signal with an appropriate algorithm, and will send to the corresponding voltage converter 4; the voltage converter 4 will generate the voltage required for working of the entire main circuit.

The supply voltage scaling module 3 is realized by applying a voltage prediction method in the present invention. It abstracts the main circuit 1 that is affected by random factors such as temperature variation, process variation, and noise, etc. into a Markov chain, and predicts the future trend of voltage variation of the main circuit according to the current state of the main circuit and the state transition probability.

Figure 2:
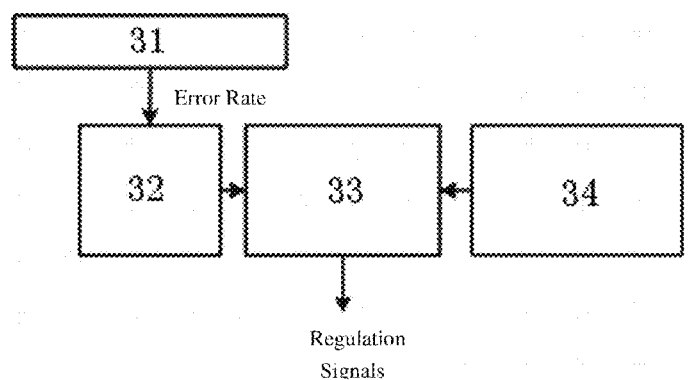
FIG. 2 is a structural block diagram of the supply voltage scaling module of the present invention; (in this figure: sampling and statistics module—31, state recording module—32, error prediction module—33, state transition probability generation module—34).

Referring to FIG. 2, the supply voltage scaling module 3 comprises a state transition probability generation module 34, a sampling and statistics module 31 connected to the output terminal of the on-chip monitoring circuit 2, and a state recording module 32 connected to the output terminal of the sampling and statistics module 31, and an error prediction module 33 connected to the output terminal of the state recording module 32 wherein, the output terminals of the state recording module 32 and state transition probability generation module 34 are connected to the input terminals of the error prediction module 33.

The on-chip monitoring circuit 2 sends the monitored error signals to the sampling and statistics module 31.

Figure 3:
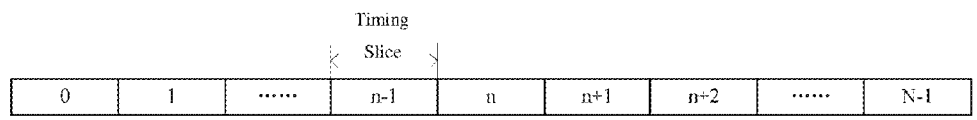
FIG. 3 is a schematic diagram of the time slices during operation of the main circuit.
Figures 4, 5:
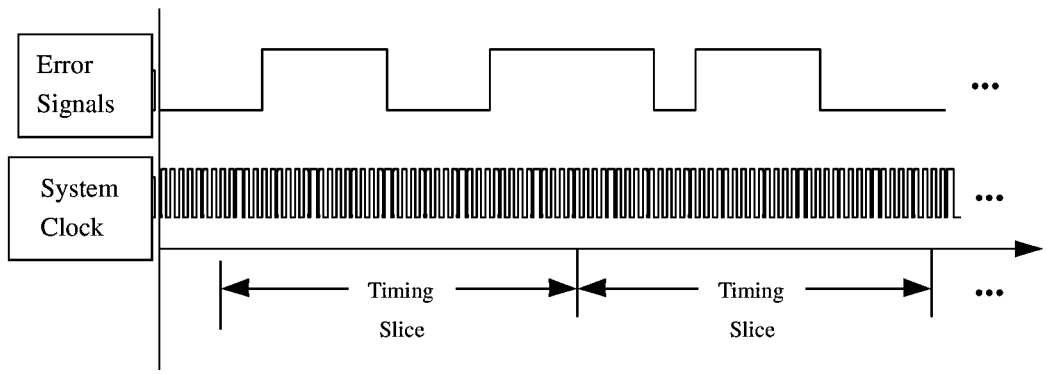
FIG. 4 is a schematic diagram of the principle of error statistics in the present invention.
FIG. 5 shows a state transition probability look-up table at a specific operating voltage.

Referring to FIGS. 3 and 4. The processing procedure of the sampling and statistics module 31 comprises the following steps:

First, divide the operation process of the main circuit 1 into N time slices in equal length according to the clock frequency and operating condition of the main circuit 1; wherein, $2 \leq n \leq N-1$, $N \geq 3$, and both N and n are integral number.

Next, perform sampling for the error signals in the main circuit sent from the on-chip monitoring circuit 2 in the $n-1^{th}$ time slice under control of the system clock at a rate of sampling once per clock cycle; when high level is sampled, the number of error signal will be incremented by 1, low level will remain unchanged; then, the total number of error signals $N_{error}$ is calculated;

Finally, calculate the error rate $R_{error}$ of the main circuit in the $n-1^{th}$ time slice: $R_{error}=N_{error}/N_{total}$, where, $N_{total}$ is the total number of sampled signals in the main circuit in the $n-1^{th}$ time slice.

Wherein, the length of time slice is not shorter than the maximum duration required for the voltage converter 4 to complete one voltage scaling cycle.

The sampling and statistics module 31 outputs the error rate of the main circuit in the n−1$^{th}$ time slice to the state recording module 32.

The state recording module 32 records the error rate of the main circuit in the n−1$^{th}$ time slice, and records the corresponding supply voltage.

In this embodiment, the state transition probability generation module 34 employs a state transition probability look-up table.

The state transition probability look-up table is created as follows: after the design of main circuit 1 is completed, the main circuit 1 is subjected to run a large-size program at different voltages (the size of the program should be determined according to the size of the main circuit and the number of inserted on-chip monitoring circuits, and no uniform standards). The state transition probabilities of the main circuit 1 from the current state skip to the next state at different voltages which are obtained by a large number of experiments, and are stored in the form of a look-up table.

Referring to FIG. 5, in this embodiment, the state transition probability look-up table stores the probability of the main circuit in a specific state in the n+1$^{th}$ time slice, which is obtained by statistics according to the state of the main circuit in the n−1$^{th}$ time slice. To simplify the system model, here the system is divided into two states: ④ and ② (however, in practice, the system can be divided into several states according to the complexity of the system, and the Markov algorithm can be improved accordingly, so as to improve the accuracy of prediction. Such assignment and improvement shall be deemed as falling into the protection scope of the present invention). State ④ corresponds to an error rate which is lower than a certain threshold, while state ② corresponds to an error rate which is higher than a certain threshold (the threshold can be set according to the statistic result and the design requirement). Since the instructions executed by the processor and the environmental factors (e.g., process variation, temperature variation, and noise, etc.) have a random nature, the generation of error signals is a random value, and meets a certain probability distribution.

$V_n$ is the system voltage when the state transition probability look-up table is created by means of statistics. For example, when $V_n$=1.2V, $p_{12}$ represents the probability that voltage of the main circuit is 1.2V presently in the system and in state ① skips to state ② in the next time slice. Since the system skipping probabilities are different at different voltages, a number of look-up tables shown in FIG. 5 required to be created, and the number of look-up tables is determined according to the design requirement, usually depends on the regulation step size of the voltage converter 4. It is known from the theory of Markov process: the transition probability look-up table shown in FIG. 5 is a first-order transfer matrix of Markov chain abstracted from the main circuit 1, and is denoted as P here.

The error prediction module 33 utilizes the Markov theory to predict the error rate of the main circuit in n+1$^{th}$ time slice according to the error rate of the main circuit in n−1$^{th}$ time slice recorded by the state recording module 32; corresponding supply voltage; and the state transition probability corresponding to the supply voltage is generated in the state transition probability look-up table.

Suppose the state recording module 32 records that the main circuit is in state ① in n−1$^{th}$ time slice, to calculate the probability that the main circuit in state ② in n+1$^{th}$ time slice, the problem can be translated into the calculation of $P\{X_{n+1}=②|X_{n-1}=①\}$, on the basis of the theory of Markov process. It is known from the probability theory: the two-step transition probability matrix of a homogeneous Markov chain with two states is $P(2)=P^2$. It is easy to derive: $P\{X_{n+1}=②|X_{n-1}=①\}=P_{12}(2)$. Wherein, $P_{12}(2)$ is the second column element in the first row of the two-step transition probability matrix P(2). In this way, the probability that the main circuit in state ② in n+1$^{th}$ time slice is calculated. Next, a digital signal for controlling the regulation step size of the voltage converter 4 is generated according to the probability, to guide the voltage converter 4 to regulate the voltage. The skipped n$^{th}$ time slice of the main circuit will be used as the time reserved for the voltage converter 4 to regulate the voltage.

The state recording module 32 records the error rate of the main circuit in the n−1$^{th}$ time slice, and the corresponding supply voltage.

Likewise, the probability that the main circuit in a specific state in n+m$^{th}$ (m≤N−n) time slice can be predicted by changing the error rates and corresponding supply voltages of the main circuit recorded by the state recording module 32 in different time slices and adjusting the Markov prediction algorithm appropriately; next, a digital signal for controlling the regulation step size of the voltage converter 4 can be generated according to the probability, to guide the voltage converter 4 to regulate the voltage.

In the present invention, a main circuit 1 with random characteristic is abstracted into a Markov chain, and the error probability of the main circuit 1 is predicted with the Markov theory, to guide the regulation of operating voltage; in this way, appropriate time can be reserved for voltage scaling in the voltage converter 4 effectively and thereby the hysteretic nature of voltage scaling is avoided; as a result, the dynamic voltage scaling is more purposive, and the circuit and system performance can be improved greatly.

The basic principle, main features, and advantages of the present invention are described and illustrated above. Those skilled in the art should appreciate that the present invention is not limited to the embodiments. What is described in the above embodiments and description is only the principle of the present invention, and various alternations and modifications can be made to the present invention without departing from the spirit and scope of the present invention; however, such alternations and modifications shall be deemed as falling into the protected domain of the present invention. The protected domain of the present invention shall be defined by the claims and their equivalents.

The invention claimed is:

1. A dynamic voltage scaling system based on on-chip monitoring and voltage prediction, comprising:
a main circuit that has integrated on-chip monitoring circuits,
a supply voltage scaling module, and
a voltage converter connected to an output terminal of the supply voltage scaling module, with an output terminal of the voltage converter connected to an input terminal of the main circuit, wherein, the supply voltage scaling module comprises
a state transition probability generation module and an error prediction module designed according to the main circuit, and a sampling and statistics module and a state recording module connected in sequence to the output terminals of the on-chip monitoring circuits, the output terminals of the state recording module and state transition probability generation module are connected to the input terminals of the error prediction module; wherein the on-chip monitoring circuits create monitored error signals and sends the monitored error signals to the sampling and statistics module which calculates the error rate of the main circuit in the current time slice, and outputs to the state recording module, and the state recording module records the error rate and the corresponding supply voltage; the error prediction module utilizes the Markov theory to predict the error rate of the main circuit in a future time slice according to the probability generated by the state recording module and the state transition probability generation module, and generate regulation signals to control the output voltage of the voltage converter.

2. The dynamic voltage scaling system based on on-chip monitoring and voltage prediction according to claim 1, wherein, the state transition probability generation module employs a state transition probability look-up table.

3. The dynamic voltage scaling system based on on-chip monitoring and voltage prediction according to claim 2, wherein, the state transition probability look-up table is created as follows: after the main circuit is designed completely, the main circuit is subjected to run a large-size program at different voltages, and perform statistics in a large quantity, to obtain the state transition probability of the main circuit from the current state skip to the next state at different voltages, and store in the form of a look-up table.

4. The dynamic voltage scaling system based on on-chip monitoring and voltage prediction according to claim 1, wherein, the processing procedure of the sampling and statistics module comprises the following steps: first, dividing the operation time of the main circuit into N time slices in equal size; next, performing statistics on the total number of error signals $N_{error}$ in the main circuit sent from the on-chip monitoring circuits in $n-1^{th}$ time slice; finally, calculating the error rate $R_{error}$ of the main circuit in the $n-1^{th}$ time slice: $R_{error}=N_{error}/N_{total}$, where, $N_{total}$ is the total number of sampled signals of the main circuit in the $n-1^{th}$ time slice; wherein, $2 \leq n \leq N-1$, $N \geq 3$, and both N and n are integral number.

5. The dynamic voltage scaling system based on on-chip monitoring and voltage prediction according to claim 4, wherein, the length of the time slice is not shorter than the maximum duration required for performing voltage scaling once by the voltage converter.

\* \* \* \* \*